UNITED STATES PATENT OFFICE.

LOUIS BODENHEIMER, OF PADUCAH, KENTUCKY.

IMPROVEMENT IN MEDICAL COMPOUND OR FEVER-AND-AGUE CURE.

Specification forming part of Letters Patent No. 121,984, dated December 19, 1871.

*To all whom it may concern:*

Be it known that I, LOUIS BODENHEIMER, of Paducah, in the county of McCracken and State of Kentucky, have invented a certain new and useful Improvement in Chill-and-Fever Cure; and I do hereby declare the following to be a full, clear, and exact description thereof, which will enable others skilled in the art to make and use the same.

My improved chill-and-fever cure consists of fifteen (15) grains of cream of tartar and five (5) grains tartaric acid for one dose, to be put in a common-sized tea-cup of new milk, or, if not new, sweet milk warmed to blood-heat, and thoroughly mixed therewith until the milk curdles; to be taken by drinking the whey therefrom early in the morning at least half an hour before breakfast, or from one to two hours before chill time.

This will pass the necessary bile from the stomach, giving increased action to the liver and kidneys, so that the patient will immediately recover. More than the second dose I have not known required to perfect a cure.

Having thus described my invention, I claim as new, and desire to secure by Letters Patent—

The compound for chill-and-fever cure, consisting of cream of tartar, tartaric acid, and milk, combined in the proportions and manner substantially as specified.

LOUIS BODENHEIMER.

Witnesses:
J. BODENHEIMER,
M. F. MOFFERT.

(98)